(No Model.)
G. KRÜGER.
PLANT SUPPORTER.
No. 500,140. Patented June 27, 1893.
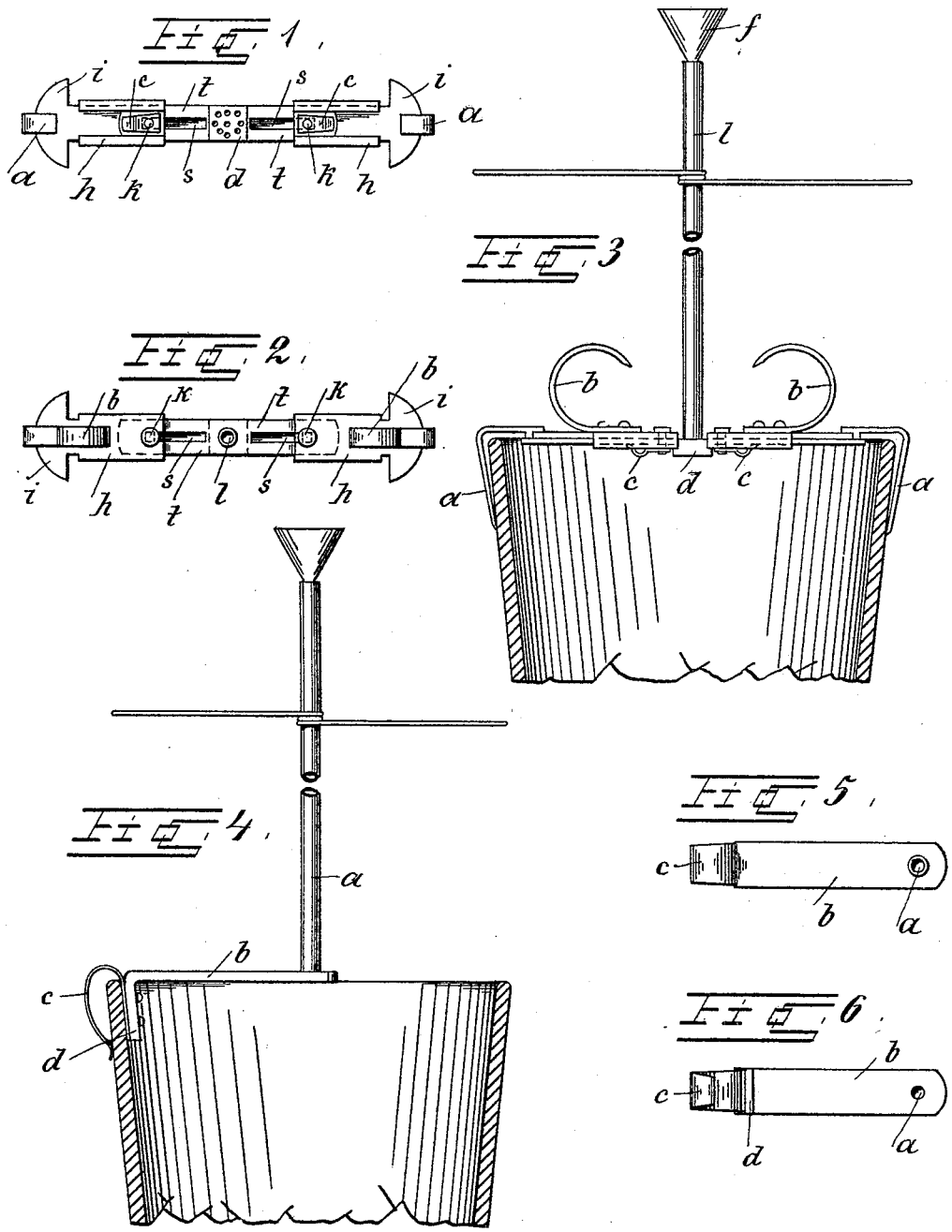
Attest
Walter Donaldson
F. L. Middleton
Inventor
Gustav Krüger
by Ellis Spear
Atty.

UNITED STATES PATENT OFFICE.

GUSTAV KRÜGER, OF STETTIN, GERMANY.

PLANT-SUPPORTER.

SPECIFICATION forming part of Letters Patent No. 500,140, dated June 27, 1893.

Application filed August 1, 1892. Serial No. 441,899. (No model.)

*To all whom it may concern:*

Be it known that I, GUSTAV KRÜGER, a subject of the Emperor of Germany, residing at Stettin, Germany, have invented certain new and useful Improvements in Plant-Supporters, of which the following is a full, clear, and exact description.

My invention relates to improvements in props or supports for plants which are grown in pots, the object of the invention being to provide a prop or support designed to be secured to the sides or edges of the pot to form a sufficient support for the plant, thus avoiding the necessity of having the lower end of the prop penetrate the earth of the pot and removing all danger of injury to the roots of the plant.

In the accompanying drawings which illustrate the invention—Figure 1 represents a bottom view of the base of the prop by means of which it is secured to the edge of the tub. Fig. 2 is a top view of the same. Fig. 3 is a side elevation of my device as secured to a pot. Fig. 4 is a similar view of a modification. Fig. 5 is a top view of the base of the prop shown in Fig. 4, and Fig. 6 is a bottom view of the same.

In the form of support illustrated in the first three figures, the base which carries the supporting rod is adapted to extend entirely across the top of the pot, from one edge to that opposite, as shown in Fig. 3. The said base is composed of a rail or bar $t$, corresponding approximately in breadth to the supporting rod. It is provided at either end with a slot $s$ extending lengthwise thereof. A bar $h$, with overhanging edges adapted to embrace the bar $t$, is provided upon each end thereof, and adjustable lengthwise to allow the device to be fitted to different sizes of pots. A suitable friction device is provided between the parts consisting of a flat spring $c$, having one end secured by the bolt $k$, which passes through the slot $s$, and into the bar $h$. The other end of the spring bears against the under side of the bar $t$. Each bar $h$, is provided at its outer end with an enlarged head or disk $i$, adapted to bear against the edge of the pot to give a firm support, and these disks are provided with the downwardly extended spring arms $a$, which are adapted to bear against the outer face of the wall of the pot to hold the support steady and in place.

In the center of the bar $t$, is supported the main plant supporting rod $l$, which consists of a hollow tube of suitable size with its lower end secured over an opening in the center of the bar $t$. Any suitable means such as wire arms or the like may be provided for securing the plant to the rod $l$. In addition to serving as a prop or support for the plant, the rod or support $l$, by being made in the form of a tube, serves as a ready means of applying water to the plant at the roots thereof, a small funnel being provided at the top as at $f$, and a perforated plate or sieve $d$, at the lower end to prevent the water from washing away the earth from the roots of the plant.

For convenience in holding the device while applying it to a pot curved arms $b$, may be secured to the plates $h$.

In Figs. 4, 5, and 6 I have shown a modification in which the rod or tube to which the plants are secured is supported upon a base or bar adapted to be secured to but one side of the pot, and in this case of course the base need not be adjustable. The tube is represented in the figures at $a$, being secured upon and aligning with an opening near the end of the base or bar $b$, in a manner similar to that described in connection with the first three figures. The bar $b$, has a downwardly bent portion $d$, adapted to rest against or parallel to the side of the pot, and when held in such a position to hold the portion $b$, in a horizontal position at the mouth of the pot. A spring $c$, secured to the portion $d$, is adapted to extend over the edge of the pot, and to bear with a strong pressure against the outside of the pot, thus holding the bar $b$, firmly in position.

I claim as my invention—

1. A plant support or prop consisting of a base, means for securing said base to the edge of the pot, and a vertical rod carried upon said base, the said rod being hollow to permit the passage of water through the same, substantially as described.

2. A plant support comprising a base extending from the edge of the pot horizontally over the mouth thereof, a spring arm secured to the base bearing against the outer face of the pot and a vertical rod mounted upon said horizontal base, substantially as described.

3. A plant support comprising the longitudinally adjustable base with its ends resting upon the upper edge of the pot upon opposite sides, means for clamping said base to the edge of the pot and a vertical rod mounted upon said base within the walls thereof, substantially as described.

4. A plant support consisting of the longitudinally adjustable base with means for clamping the same to the edge of the pot, an opening in the center of the base, a hollow rod secured above the opening, and a perforated plate secured beneath the lower end of said hollow rod, substantially as and for the purpose set forth.

5. A plant support consisting of the bar $t$ provided with the slots $s$, the bars $h$, adjustably connected therewith, clamping springs $a$, carried upon the ends of the bars $h$, arms $b$, secured to the bar $t$, and a hollow rod secured above an opening in the said bar $t$, and the strainer or sieve located upon the end of the rod, substantially as described.

In witness whereof I have hereunto set my hand in presence of two witnesses.

GUSTAV KRÜGER.

Witnesses:
JEHANNES GOLLUARD,
ZURS KIRCHER.